METHOD OF PRODUCING DICALCIUM FERRITE SINTER

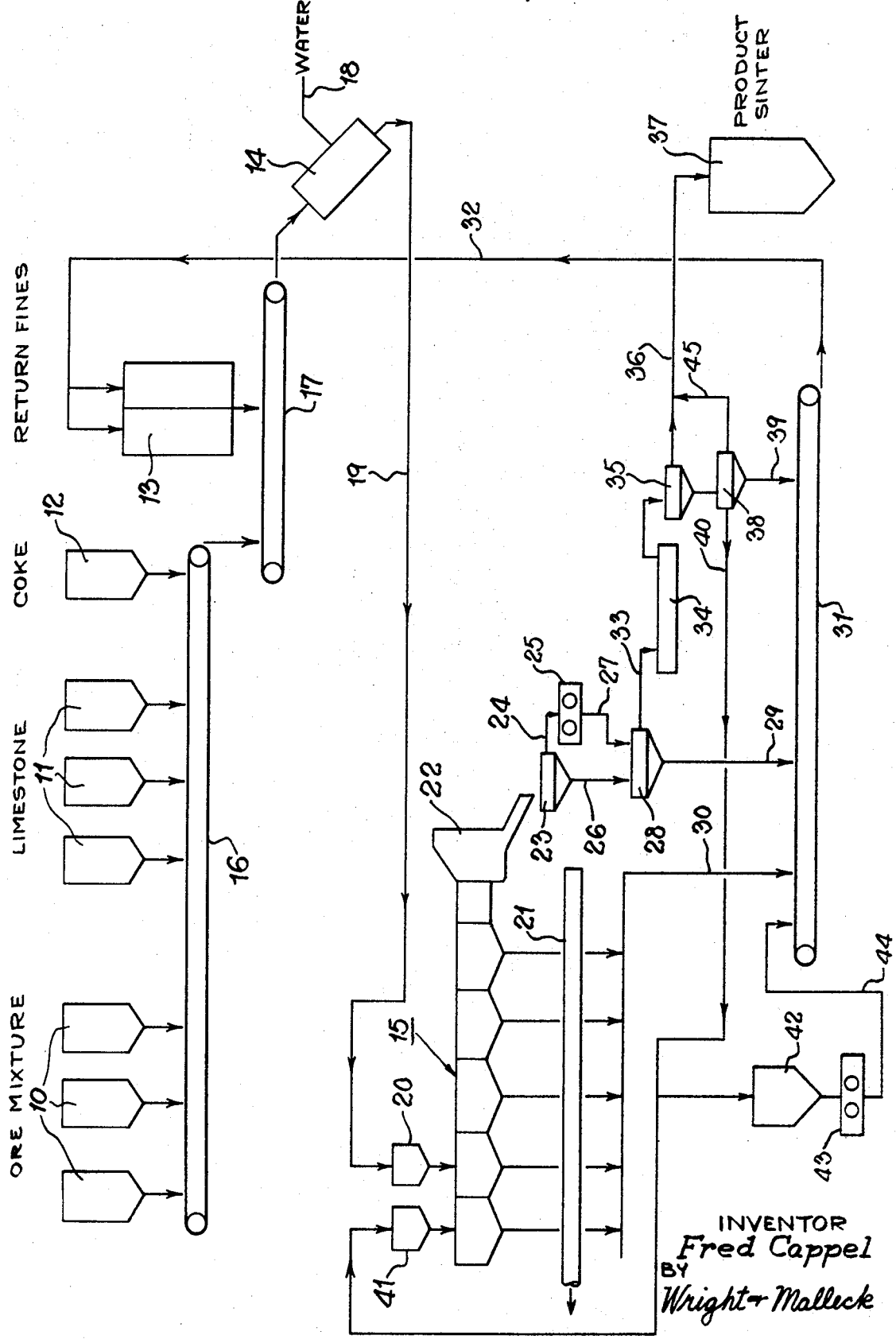

Fred Cappel, Neu Isenburg, Germany, assignor to Republic Steel Corporation, Cleveland, Ohio
Filed Mar. 3, 1969, Ser. No. 803,926
Int. Cl. C01g 49/00
U.S. Cl. 23—51 R      13 Claims

ABSTRACT OF THE DISCLOSURE

Method of producing dicalcium ferrite sinter $$(2CaO \cdot Fe_2O_3)$$

of improved properties which comprises: preparing an admixture of raw materials containing iron oxide bearing materials, preferably steel mill waste products, such as flue dust, precipitator dust, blast furnace gas scrubber sludge, mill scale, dust from basic oxygen steel production and the like, and calcium oxide bearing materials, such as limestone and/or dolomite, plus a solid carbonaceous fuel, such as coke or coke breeze, as required and in proportions to produce a dicalcium ferrite sinter on igniting and sintering, and adding to said raw materials admixture sintered fines from a previous sintering operation to the extent of about 30–50% and preferably about 30–40% by weight of said raw materials admixture and for purposes of controlling the process, improving strength, storageability and sintering properties, and igniting the resultant admixture and sintering into a uniformity well burned sinter.

---

This invention pertains to the production of calcium ferrite sinters for use in blast furnace and steel refining operations, and provides an improved process for producing a predominantly dicalcium ferrite sinter $$(2CaO \cdot Fe_2O_3)$$

of superior properties as compared to prior art practises and products.

The invention is particularly adapted for the recovery of iron values from steel mill waste products, such as flue dust, slurry from blast furnace gas scrubbers, mill scale, dust from basic oxygen or B.O.F. steel works, etc., as well as for supplying lime values for blast furnaces and steel refining operations in combined agglomerated form with said iron values and of a particle size suitable for burden materials.

Although the use of calcium ferrite sinters for purposes aforesaid is known from the published art, the use of dicalcium ferrite for such purposes has not been stressed and more particularly, no process for producing a predominantly dicalcium ferrite sinter of acceptable properties has been disclosed in the published art, insofar as I am aware.

Such a process is, however, described in a copending application of Fedock et al., Ser. No. 509,303, filed Nov. 23, 1965 (now Pat. No. 3,519,386), of common ownership with the instant application. According to the process of said Fedock et al. application, raw materials comprising limestone, solid carbonaceous fuel such as coke breeze, and iron oxide bearing materials, such as iron ore and iron oxide bearing waste products of the character above mentioned, are admixed in accordance with a balanced formulation within limits of about 50–55% limestone, 6–10% of said solid carbonaceous fuel and 35–40% of iron oxide, and ignited for about 3 minutes at about 1650–2000° F. or 900–1100° C. An excellent predominantly dicalcium-ferrite sinter is thus obtained.

I have discovered, however, in accordance with the present invention, that control of the process and the properties of the sinter may be still further improved by recycling to the sinter furnace input feed in the form of sufficiently comminuted fines, a portion of the sinter product from the furnace output in proportions such that the recycled fines constitute about a 30–50%, and preferably about a 30–40% by weight addition to the raw materials to the furnace, such as limestone and/or dolomite, coke and the iron oxide values. This is to say for each 100 pounds of raw materials feed to the furnace input comprising iron oxide and lime values plus carbonaceous fuel, there should be added about 30–50 and preferably about 30–40 pounds of recycled sinter fines. The percent by weight of raw feed in the final input mix to the furnace is thus determined by the following formula:

$$100\% \cdot \frac{100 \text{ lbs. raw feed}}{100+x \text{ lbs. return fines}}$$

= Wt. and raw feed in final mix

For the values of $x$=to 30, 40 and 50 pounds respectively, the weight percent of raw material feed in the final mix is 77%, 71.5% and 66.5%, respectively, the balance being sintered return fines. Thus, according to the invention, the recycle sintered return fines should comprise in round numbers about 23 to 29% and preferably about 23 to 34% by weight of the total final input mix to the furnace.

I have further discovered that the normal crushing and screening of the sintered product to separate the usable burden product as to particle size from the normally produced amount of fines does not, in general, provide a sufficient amount of the latter to provide the requisite amount of recycle or return fines for purposes of my invention, and that to supply the deficiency, it is necessary to reduce a small fraction of the burden product to fines for recycling along with the fines normally produced. Normally, the return fines amount to only about 10–20% by weight of the total sinter product.

My discoveries aforesaid are based on the following series of experiments. Admixtures of raw materials comprising flue dust sludge, blast furnace gas scrubber sludge, precipitator dust, mill scale, or fines and ground limestone, in various proportions, with and without ground coke additions as required and with moisture contents adjusted within the range of about 4–7%, and sintered return fines additions within the range of 25–50% were ignited at various temperatures within the range of about 1100–800° C. and pot sintered for varying periods within the range of about 9–18 minutes under suction conditions of about 400 mm. water gauge and bed heights ranging from about 20–50 cm. Sintering behaviour and production rates were noted and specimens of the sinters produced from each run were subjected to hydration, tumble and shatter tests to determine the properties of the sintered product as regards storage stability, strength and uncombined lime content.

The shatter test consisted in dropping the sinter cake three times from a height of two meters onto a steel plate and classifying the shattered product on screens into fractions of +20 mm., 8–20 mm. and −8 mm. The −8 mm. fraction was employed as return fines.

The ratio of return fines (RA) produced during the shatter test, to the total return fines (RE) employed in each test was determined and is designated herein as the return fines balance RA/RE in percent. During most of the tests wherein a 30% return fines addition was desired, this value was below 100%. For this reason, the deficient amount of return fines for the next succeeding test had to be obtained by crushing sinter product material.

The sinter product obtained after the last screening stage, supra, was checked for strength. The test was performed in an ASTM drum (diameter 90 cm., length 45 cm.). 11.2 gms. of sinter fraction of 8–20 mm., were tumbled for 8 minutes at 25 r.p.m. and screened. The fraction of −3 mm. thus obtained was taken as a comparative measure of sinter strength.

In order to check the storage stability of the sinter, specimens of each sinter were submitted to a hydration test. 5 kg. of sinter of the fraction 8–20 mm. were charged into a metal bucket. 90 gm. of water in an open tin container were placed within the bucket. The bucket was closed and placed in a dryer and held therein for 16 hrs. at 105° C., following which the sinter was screened. The portion of fraction −3 mm. was taken as a comparative measure of storage stability of the sintered product.

The following Table I gives test results thus obtained pertinent to the present invention, wherein the column headings are as above explained. All tests were made under comparable conditions except for the variation in percent of return fines addition to the raw materials mix.

TABLE I.—INFLUENCE OF PERCENT OF RECYCLE FINES ON PRODUCTION RATE AND QUALITY OF SINTERED PRODUCT

| Percent return fines addition | Percent RA/RE | Hydration test, percent −3 mm. | Tumbler test, percent −3 mm. | Shatter test screen anal., percent | | | Output metric tons/day | Sintering time, min. | Sintered product |
|---|---|---|---|---|---|---|---|---|---|
| | | | | +20 mm. | 20 −8 mm. | −8 mm. | | | |
| 25 | 116.2 | 18.4 | 9.11 | 40.7 | 30.4 | 28.9 | 34.9 | 8.8 | Non-uniformly burnt.* |
| 30 | 84.0 | 14.2 | 9.46 | 40.0 | 36.0 | 24.0 | 34.2 | 9.0 | Well-burnt. |
| 35 | 76.6 | 19.7 | 9.73 | 39.3 | 36.6 | 24.1 | 32.8 | 9.4 | Do. |
| 40 | 82.2 | 2.0 | 10.8 | 43.0 | 43.0 | 25.5 | 28.7 | 12.0 | Do. |
| 50 | 59.6 | | | 40.9 | 35.7 | 23.4 | 30.1 | 9.2 | Do. |
| 80 | 36.0 | 56.8 | 9.3 | 56.6 | 25.6 | 17.8 | 24.7 | 13.3 | Non-uniformly burnt.* |

*Spotty or channeled sintering.

Referring to the test data, it will be seen that as the percent return fines addition was progressively increased from 25 to 40%, the hydration and tumble tests showed progressively increasing improvements in storage and hardness properties, but deterioration for a return fines addition of 80%.

The shatter test screen analysis data reveals that the +20 mm., 20−8 mm. and −8 mm. fractions were not greatly influenced by the variation in percent return fines addition at and about 30%.

Under the "Sintered Product" column, it will be noted that for all the tests within the range of 30–50% return fines, the sintered product was "well burnt," meaning that it was of excellent quality, whereas for the 25% return fines addition, the sintered product was non-uniformly burnt and hence, of unacceptable quality.

It will be noted from the percent RA/RE data, that the ratio of return fines produce (RA) to the return fines fed (RE) exceeded 100% only for the 25% return fines level, and these return fines were largely dusty, unsintered material. Hence, at all other such levels it was necessary to supply added return fines by crushing a small fraction of the sinter burden product.

The results of the pot sintering tests above described were confirmed by moving grate sintering machine tests, employing an apparatus and flow sheet arrangement as shown diagrammatically in the accompanying drawing, as described below.

In practising the invention on a commercial scale, the iron oxide bearing materials employed may comprise any of the various iron ores crushed to a fine grain size, but preferably comprises such steel mill circulation materials as: mill scale, flue dust, blast furnace gas scrubber sludge, dust from steel works, dust from basic oxygen furnaces, etc.

The calcium carbonate can be supplied to the process either alone or in admixture with other minerals or carbonates. It can be supplied as mixed stone, limestone, dolomite, and the like. It has been found desirable in certain embodiments to use about 20% less than the stoichiometric quantity of stone. The stone or other calcium carbonate source is advantageously sized to provide the most complete reaction with the iron-bearing materials. Thus, the stone can be crushed or otherwise reduced to pass through screens of 0.12" (3 mm.).

In some embodiments it is desirable to have a quantity of solid carbonaceous fuel present with the iron-bearing material and calcium carbonate. A preferred fuel in such usage is coke or coke breeze, preferably crushed and/or screened to 0.12" (3 mm.). Practice of the present process can require from little or no fuel addition to the sinter mixture due to fuel values inherent in part of the iron-bearing components. A fuel level equivalent to 6.5–8.5% coke breeze is preferred.

The sintering is carried out after ignition at temperatures on the order of 800°–1100° C. A suction is maintained across the sinter bed by means of fans, blowers, or other appropriate air induction means. A draft of 20–40 inches water gauge is advantageously employed. Bed heights of about 6–20" (15–50 cm.) can be used. Good results are obtained with bed depths of 10" or 25 cm. or greater, but there is generally no advantage obtained from the use of bed heights greater than 15" or 38 cm.

Prior to feeding the mixture of iron-oxide bearing material, calcium carbonate or equivalent, fuel, if any, and sinter return fines to the sinter bed, the components of the feed are thoroughly mixed. This can advantageously be carried out by feeding the components of the mix into a rotary drum. If the raw feed does not contain sufficient moisture water may be added to the mixing drum. The mix should contain about 4.5 to 7% moisture.

After the sintering of the components is completed, the product is cooled and screened. The sinter cake is preferably reduced by crushing and screening to a maximum particle size of about 2". The material below 0.3" (8 mm.) in particle sizes is considered fines and is recycled to the feed material for the sinter. This material will be found, as above stated, in general inadequate to furnish enough of sinter return fines for production of a well-burned sinter, so enough of the larger particle product material must be crushed or otherwise reduced in particle size to provide, as above stated, about 30–50% and preferably about 30–40% sinter return fines additions by weight of the raw feed to the process.

Referring to the drawing, the flow in the process is from the raw materials ore bins 10, stone bins 11, and coke supply bins 12 past the sintered recycle fines supply bins 13 through mixer 14 and thence into sinter machine 15. The feed materials flow along conveyors 16 and 17 into mixer 14 into which water is introduced via line 18, if required. The mixed sinter feed containing sintered fines from bin 13 passes along conveyor means 19 to a hopper 20 whence the feed passes onto the grate of the sinter machine 15. Suction air flow through the grate is induced through main 21. The sintered product discharged from the grate passes through a spiked roll crusher 22 and onto a screen 23 of a mesh to pass particles of 2 inches in size. Larger particles retained on the screen are fed as at 24, into a roll crusher 25, and crushed to a maximum size of about 2 inches. The particles passing through screen 23 and roll crusher 25 are delivered as at 26, 27 onto a screen 28 of a mesh to pass particles of −0.3" (−8 mm.). The −0.3" (−8 mm.) fines from screen 28 together with fines recovered from the air blower system are delivered, as at 29, 30, onto a conveyor 31, and fed thence, as at 32, to the return fines bins 13. The larger particles retained on screen 28 are fed as at 33 into a cooler 34, and thence screened on a sive 35 of a mesh to pass —0.8" (20 mm.) particles. The 0.8–2.0 inch (20–50 mm.) particles retained on screen 35 are fed as at 36 to a product sinter bin 37. The —0.8" (20 mm.) particles passing through screen 35 are fed to a screen 38, of a mesh to pass particles of —0.3" (—8 mm.) which are delivered, as at 39, onto conveyor 31. A portion of the 0.3–0.8" (8+20 mm.) particles retained on screen 38 are conveyed to the extent required, as at 40, into a hopper 41 at the feed end of the sinter machine for use as a hearth layer. Another portion is delivered via 40 into a hopper 42 which discharges as required into a roll crusher 43 for crushing to —0.3 (—0.8 mm.) sinter fines delivered as at 44 onto conveyor 31 to provide additional fines as required for return fines feed to the sinter machine. Any excess of the 0.3–0.8" retention on screen 38 is delivered, as at 45 to the product sinter bins 37.

EXAMPLE

By way of exemplification of the invention as applied to commercial production, 93.3 tons/hr. of iron oxide bearing material from hoppers 10, 114.4 tons/hr. of limestone from hoppers 11, and 4.6 tons/hr. of coke breeze from hopper 12 are added to 60 tons/hr. of sinter fines from bins 13, all being crushed and screened to —0.3" (—8 mm.). The combined mass is admixed in drum 14 with the addition of 20 tons/hr. of water. The material discharged from drum 14 is fed to sinter machine 15 and sintered. The 227.3 tons/hr. of burned sinter obtained, is treated in spiked roll crusher 22 and thence screened as at 23, and the retained fraction crushed as at 25, to provide a maximum particle size of 2" delivered onto screen 28. It is separated on screen 28 into fractions of 202.3 tons/hr. of 0.3–2" particles and 25 tons/hr. of —0.3" (—8 mm.) particles. The retained fraction is fed into cooler 34.

The discharge from the cooler is passed to screen 35 where it is separated into 93.3 tons/hr. of dicalcium ferrite sinter product having a particle size of 0.8–2", and 109 tons/hr. of —0.8", delivered onto screen 38 and separated into 92 tons/hr. of 0.3–0.8" (8–20 mm.) particles, and 17 tons/hr. of —0.3" (—8 mm.) fines. The fines from screen 38 are returned to bin 13 for recycle. Of the 92 tons/hr. of particles retained on screen 38, 56 tons/hr. is fed to the product sinter bin 37, 28 tons/hr. is removed to bin 41 for use as hearth layer in the sintering machine 15, and 18 tons/hr. is fed to bin 42 and thence to roll crusher 43 to produce extra —0.3" (—8 mm.) return fines which are carried to bins 13.

The product sinter discharged from the process is found to be very uniformly burned, dicalcium ferrite sinter which produces excellent results when used as blast furnace burden, especially as applied to the reduction of beneficiated taconite ore pellets.

Preferred raw material mixes for producing dicalcium ferrite sinter in accordance with the invention will contain on a dry weight basis, about 50–60% limestone or equivalent such as dolomite, about 6.5 to 8% of coke and the balance iron oxide bearing materials.

What is claimed is:

1. The method of producing dicalcium ferrite sinter of improved properties which comprises: preparing an admixture of raw materials containing iron oxide bearing materials and calcium oxide bearing materials in proportions to produce a dicalcium ferrite sinter on heating to sintering temperature, a solid carbonaceous fuel in amount required to comprise about 6 to 10% by weight of said raw materials admixture, and water in amount required to provide a moisture content of about 4 to 7% of $H_2O$ by weight thereof, adding to said raw materials mixture, an amount of dicalcium ferrite recycle sinter fines of about 8 millimeter and under in particle size and in amount equal to about 30 to 50% of the weight of said raw materials admixture, igniting the resultant admixture and sintering at about 1100 to 800° C. until a uniformly burned sinter is obtained.

2. The method according to claim 1 wherein said dicalcium ferrite sinter recycle fines addition comprises about 30 to 40% of the weight of said raw materials admixture.

3. The method according to claim 1 wherein said resultant admixture is comminuted to a particle size of about 8 millimeters and under prior to said ignition and sintering.

4. The method according to claim 1 wherein said calcium oxide bearing material comprises about 50 to 60% by weight of said resultant admixture.

5. The method according to claim 1 wherein said iron oxide bearing materials are selected principally from the group consisting of iron ore fines and steel mill waste products, including flue dust, precipitator dust, blast furnace gas scrubber sludge, mill scale, and dust from oxygen steel production.

6. The method according to claim 1 wherein said calcium oxide bearing material is selected from the group consisting of limestone, dolomite and admixtures thereof.

7. The method according to claim 1 wherein said dicalcium ferrite sinter recycle fines comprise about 23 to 34% by weight of said resultant admixture of said raw materials and said sinter fines.

8. The method according to claim 1, wherein said dicalcium ferrite sinter recycle fines comprise about 23 to 29% by weight of said resultant admixture of said raw materials and said sinter fines.

9. A continuous process for producing dicalcium ferrite sinter in a sintering machine provided with a travelling grate, burners disposed above the grate and means for inducing a flow of air downwardly through the grate; said method comprising: continuously feeding onto said grate a finely comminuted feed admixture containing iron oxide bearing materials and calcium oxide bearing materials in proportions to produce a dicalcium ferrite sinter, about 6 to 10% carbonaceous fuel, about 4 to 7% of $H_2O$, and about 23 to 34% of dicalcium ferrite sinter fines, said percentages being by weight of the total weight of said admixture, progressively heating said admixture to ignition temperature and thence sintering until a uniformly burned sinter is obtained, thence progressively discharging said sinter from said grate, progressively crushing said sinter discharge and classifying as to particle size by screening into sinter fines of about 8 millimeter and under in particle size, and particles of larger size, admixing said sinter fines as recycle sinter fines with fresh supplies of said iron oxide and calcium oxide bearing materials and carbonaceous fuel in proportions to comprise said 23 to 34% by weight of said feed admixture, and said crushing and screening being regulated to provide sufficient recycle sinter fines to provide said 23 to 34% weight percent of said feed admixture as a continuous operation.

10. The method according to claim 9 wherein said sinter recycle fines comprise about 23 to 29% by weight of said feed admixture.

11. The method according to claim 9 wherein said feed admixture including said sinter recycle fines are comminuted to a particle size of about 8 millimeters and under.

12. The method according to claim 9 wherein said calcium oxide bearing materials comprise about 50 to 60% of said feed admixture by weight of the total and are selected from the group consisting of limestone, dolomite, and admixtures thereof.

13. The method according to claim 9 wherein said feed admixture following ignition is sintered at temperature of about 1100–800° C.

References Cited

UNITED STATES PATENTS 2,159,977  5/1939  Nicholas _____ 75—94 X
3,163,519  12/1964  Hanson et al. _____ 75—94 X

FOREIGN PATENTS 45,744  5/1939  Netherlands _____ 75—94

HERBERT T. CARTER, Primary Examiner

U.S. Cl. X.R.

75—93 F, 94